US006807546B2

(12) United States Patent
Young-Lai

(10) Patent No.: US 6,807,546 B2
(45) Date of Patent: Oct. 19, 2004

(54) DATABASE SYSTEM WITH METHODOLOGY FOR DISTRIBUTING QUERY OPTIMIZATION EFFORT OVER LARGE SEARCH SPACES

(75) Inventor: Matthew Young-Lai, Waterloo, CA (US)

(73) Assignee: Sybase, Inc., Dublin, CA (US)

(*) Notice: Subject to any disclaimer, the term of this patent is extended or adjusted under 35 U.S.C. 154(b) by 18 days.

(21) Appl. No.: 10/249,791

(22) Filed: May 8, 2003

(65) Prior Publication Data
US 2004/0030677 A1 Feb. 12, 2004

Related U.S. Application Data
(60) Provisional application No. 60/403,006, filed on Aug. 12, 2002.

(51) Int. Cl.[7] .............................................. G06F 17/30
(52) U.S. Cl. ......................................... 707/102; 707/3
(58) Field of Search .............................. 707/3, 2, 100, 707/102

(56) References Cited

U.S. PATENT DOCUMENTS

| | | | |
|---|---|---|---|
| 4,853,843 A | 8/1989 | Ecklund ...................... 707/203 |
| 5,058,002 A | 10/1991 | Nakamura et al. .............. 707/1 |
| 5,089,954 A | 2/1992 | Rago ............................ 707/10 |
| 5,423,037 A | 6/1995 | Hvasshovd .................. 707/202 |
| 5,471,613 A | 11/1995 | Banning et al. ................ 707/4 |
| 5,499,367 A | 3/1996 | Bamford et al. ................ 707/8 |
| 5,515,531 A | 5/1996 | Fujiwara et al. ................ 707/3 |
| 5,551,027 A | 8/1996 | Choy et al. .................. 707/201 |
| 5,555,404 A | 9/1996 | Torbj et al. .................. 707/202 |
| 5,625,815 A | 4/1997 | Maier et al. .................... 707/8 |
| 5,671,403 A * | 9/1997 | Shekita et al. .................. 707/3 |
| 5,727,197 A | 3/1998 | Burgess et al. ................. 707/2 |
| 5,822,747 A | 10/1998 | Graefe et al. ................... 707/2 |
| 5,842,207 A | 11/1998 | Fujiwara et al. ................ 707/7 |
| 5,848,404 A | 12/1998 | Hafner et al. .................. 707/3 |
| 5,850,522 A | 12/1998 | Wlaschin .................... 709/215 |
| 5,987,449 A | 11/1999 | Suciu ............................. 707/3 |
| 5,991,758 A | 11/1999 | Ellard ............................ 707/6 |
| 6,092,061 A | 7/2000 | Choy ............................. 707/1 |
| 6,105,018 A | 8/2000 | Demers et al. ................. 707/2 |
| 6,253,195 B1 | 6/2001 | Hudis et al. ................... 707/2 |
| 6,341,286 B1 | 1/2002 | Kawano ..................... 707/101 |
| 6,349,310 B1 | 2/2002 | Klein et al. ................. 707/200 |
| 6,353,818 B1 * | 3/2002 | Carino, Jr. ..................... 707/2 |
| 6,374,232 B1 | 4/2002 | Dageville et al. .............. 707/2 |
| 6,421,687 B1 | 7/2002 | Klostermann ............... 707/202 |
| 6,439,783 B1 | 8/2002 | Antoshenkov ................. 707/3 |
| 6,567,812 B1 | 5/2003 | Garrecht et al. ............ 707/100 |
| 6,571,249 B1 | 5/2003 | Garrecht et al. ............ 707/100 |
| 6,598,044 B1 | 7/2003 | Waas et al. ..................... 707/3 |
| 6,633,817 B1 | 10/2003 | Walker et al. ................. 702/2 |
| 2003/0229639 A1 * | 12/2003 | Carlson et al. ............. 707/100 |

OTHER PUBLICATIONS

Chihping Wang; Ming–Syan Chen; On the Complexity of Distributed Query Optimization; Knowledge and Data Engineering, Aug. 1996IEEE Transactions on , vol.: 8 , Issue: pp.: 650–662.*

Jhingran, A.; Padmanabhan, S.; Shatdal, A.;Advances in Parallel and Distributed Systems, Oct. 1993., Proceedings of the IEE Workshop on , pp. 144–119.*

* cited by examiner

*Primary Examiner*—Diane D Mizrahi
(74) *Attorney, Agent, or Firm*—John A. Smart; G. Mack Riddle

(57) ABSTRACT

In a database system, a method for optimization of a query is described. When a query is received which requests data from a database, a plurality of plans which can be used for obtaining data requested by the query are enumerated. A search tree is created based upon these plans, with nodes of the search tree representing segments of the plans. A limited number of nodes of the search tree are selected for evaluation to limit the effort spent on query optimization. A complete plan for execution of the query is generated by evaluating the selected nodes of the search tree and, if the evaluation determines that a given node is more favorable than comparable nodes previously evaluated, retaining the given node as part of the complete plan.

38 Claims, 6 Drawing Sheets

A SEARCH TREE FOR THREE QUANTIFIERS (q1, q2, q3)
ASSUMING THAT ALL PERMUTATIONS ARE VALID

PART OF A SEARCH TREE. THE TRIANGLES REPRESENT PARTS
OF THE TREE THAT ARE NOT DETAILED.

US 6,807,546 B2

DATABASE SYSTEM WITH METHODOLOGY FOR DISTRIBUTING QUERY OPTIMIZATION EFFORT OVER LARGE SEARCH SPACES

CROSS REFERENCE TO RELATED APPLICATIONS

The present application is related to and claims the benefit of priority of the following commonly-owned, presently-pending provisional application(s): application serial No. 60/403,006, filed Aug. 12, 2002, entitled "Database System with Methodology for Distributing Query Optimization Effort Over Large Search Spaces", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

This application includes a transmittal under 37 C.F.R. Sec. 1.52(e) of a Computer Program Listing Appendix. The Appendix comprises text files that are IBM-PC machine and Microsoft Windows Operating System compatible. The files include the following list of files.
Object Description: File 1; Object ID: qog_subplannode.txt, created: May 6, 2003, 10:47 am, size 3.62 KB; Object Contents: Source Code.
Object Description: File. 2; Object ID: qog_optgov.txt, created: May 6, 2003, 10:48 am, size 6.07 KB; Object Contents: Source Code.
All of the material disclosed in the Computer Program Listing Appendix can be found at the U.S. Patent and Trademark Office archives and is hereby incorporated by reference into the present application.

BACKGROUND OF INVENTION

1. Field of the Invention

The present invention relates generally to information processing environments and, more particularly, to a database management system (DBMS) having a methodology for distributing query optimization effort over large search spaces.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information may be retrieved from, or updated in, such files; and so forth, all without user knowledge of underlying system implementation. In this manner, the DBMS provides users with a conceptual view of the database that is removed from the hardware level. The general construction and operation of a database management system is known in the art. See e.g., Date, C., "An Introduction to Database Systems, Volume I and II", Addison Wesley, 1990; the disclosure of which is hereby incorporated by reference.

DBMS systems have long since moved from a centralized mainframe environment to a decentralized or distributed environment. One or more PC "client" systems, for instance, may be connected via a network to one or more server-based database systems (SQL database server). Commercial examples of these "client/server" systems include Powersoft (r) clients connected to one or more Sybase (r) SQL Anywhere (r) Studio (Adaptive Server (r) Anywhere) database servers. Both Powersoft and Sybase SQL Anywhere Studio (Adaptive Server Anywhere) are available from Sybase, Inc. of Dublin, Calif.

In today's computing environment, database technology can be found on virtually any device, from traditional mainframe computers to cellular phones. Sophisticated applications, whether human resources information systems or sales force automation systems, can "push" much of their complexity into the database itself. Indeed, this represents one of the main benefits of database technology. The challenge, however, is to support these applications, and the complex queries they generate, on small computing devices. At the same time, users expect the productivity and reliability advantages of using a relational DBMS.

One purpose of a database system is to answer decision support queries. A query may be defined as a logical expression over the data and the data relationships set forth in the database, and results in the identification of a subset of the database. Consider, for instance, the execution of a request for information from a relational DBMS. In operation, this request is typically issued by a client system as one or more Structured Query Language or "SQL" queries for retrieving particular data (e.g., a list of all employees earning $10,000 or more) from database tables on a server. In response to this request, the database system typically returns the names of those employees earning $10,000, where "employees" is a table defined to include information about employees of a particular organization. The syntax of SQL is well documented, see e.g., "Information Technology—Database languages—SQL", published by the American National Standards Institute as American National Standard ANSI/ISO/IEC 9075: 1992, the disclosure of which is hereby incorporated by reference.

SQL queries express what results are requested but do not state how the results should be obtained. In other words, the query itself does not tell how the query should be evaluated by the DBMS. Rather, a component called the optimizer determines the "plan" or the best method of accessing the data to implement the SQL query. The query optimizer is responsible for transforming an SQL request into an access plan composed of specific implementations of the algebraic operator selection, projection, join, and so forth. The role of a query optimizer in a relational DBMS system is to find an adequate execution plan from a search space of many semantically equivalent alternatives. One component of this task is join enumeration. Since relational databases typically only provide physical operators that can join two tables at a time, an n-way join must be executed as a sequence of two-way joins, and there are many possible such sequences. The optimizer must enumerate some or all of these sequences and choose one based on estimates of their relative execution costs. In general, this problem is NP-complete. (See e.g., Ibaraki, T. et al "On the Optimal Nesting Order for Computing N-Relational Joins", ACM Transactions on Database Systems, 9(3): 482–502, September 1984. See also e.g., Ono, K. et al "Measuring the Complexity of Join Enumeration in Query Optimization", in Proceedings of the 16th International Conference on Very Large Data Bases, pp. 314–325, Brisbane, Australia, August 1990, Morgan Kaufmann; and Steinbrunn, M. et al "Heuristic and Randomized Optimization for the Join Ordering Problem", The VLDB Journal, 6(3): 191–208, August 1997.) An NP-complete problem is any one of a class of computational problems for which no efficient solution has been found.

In practice, query optimizers restrict the sequences or plans that are considered so that an adequate plan can be found in a reasonable amount of time. Examples of such limitations include: restricting the search to left-deep trees where the inner operand of each join is a single table (see e.g., Cluet, S. et al "On the Complexity of Generating Optimal Left-deep Processing Trees with Cross Products", in Proceedings of the Fifth International Conference on Database Theory (ICDT '95), pp. 54–67, Prague, Czech Republic, January 1995, Springer-Verlag); requiring each join to have at least one equi-join predicate of the form (column1=column2); considering only a subset of the available physical join methods (e.g., only nested loop joins); considering only a subset of the possible table access methods (e.g., only index scans); and deferring Cartesian products as late in the plan as possible. (See e.g., Morishita, S. "Avoiding Cartesian Products for Multiple Joins", Journal of the ACM, 44(1): 57–85, January 1997. Also see e.g., Selinger, P. G. et al "Access Path Selection in a Relational Database Management System", in ACM SIGMOD International Conference on Management of Data, pp. 23–34, Boston, Mass., May 1979.) Choosing a set of restrictions for a given query defines a search space of possible plans that may be considered by a search operation.

Deciding how to restrict a search space for a particular query is not straightforward. On one hand, a larger space improves the possibility of finding a better plan. On the other, it also guarantees an increase in the cost of performing the search. If a query is to be optimized once and executed repeatedly, a longer optimization time may be justified. For interactive queries, however, one should optimize the total time spent on execution plus the time spent on the optimization process itself.

A difficulty with choosing search space restrictions is that there is not always a direct, linear relationship between the size of the search space and the optimization time. This is the case because most search operations prune (i.e., do not consider) parts of the space that provably cannot contain an optimal plan. The amount of such pruning that is possible can vary considerably depending on the cost distribution of the plans in the space and the order in which plans are visited.

Manual control of the parameters that restrict search space size may sometimes be useful. It is usually better, however, if a query optimizer makes such choices automatically. A technique where a series of (not necessarily disjoint) search spaces are defined and searched in sequence is described in U.S. Pat. No. 5,301,317 by Lohman, G. M. et al entitled "System for Adapting Query Optimization Effort to Expected Execution Time". In the system described by Lohman, when the search of one space is finished, the cost of searching the next space is estimated and compared to the estimated execution cost of the best plan that has been found. The overall search is halted if the estimated cost of searching the next space exceeds the expected benefit. It is difficult to predict the benefit, but a heuristic is to assume that it will be some fixed fraction (e.g., ten percent) of the estimated cost for the best plan that has been identified. It is also difficult to estimate the cost of searching a space. An upper bound can be obtained by multiplying the cost of enumerating a single plan by the total size of the space. However, this really is just an upper bound since, as noted above, the amount of pruning performed by a search operation may vary considerably. Overall, this technique can be seen as one possible way of automatically choosing search space parameters. However, an undesirable characteristic of this approach is that it may enumerate some plans twice if they appear in more than one search space. Another problem is that the decision to stop the search is only considered after each complete space is finished. For large join degrees, every one of these spaces may be very large. As such, the technique does not allow fine-grained control over how much total effort is spent upon enumeration.

A join enumeration operation based on depth-first search of a space of left-deep trees is described by Bowman, I. T. and Paulley, G. N. in "Join Enumeration in a Memory Constrained Environment", in Proceedings, Sixteenth IEEE International Conference on Data Engineering, pp. 645–654, San Diego, Calif., IEEE Computer Society Press, March 2000. This depth-first join enumeration search operation is also described in commonly-owned U.S. Pat. No. 6,516,310 titled "System and Methodology for Join Enumeration in a Memory-Constrained Environment", the disclosure of which is hereby incorporated by reference in its entirety, including any appendices or attachments thereof, for all purposes. One advantage of the approach described by Bowman and Paulley is that it uses very little memory relative to the widely used technique of dynamic programming. (See e.g., Selinger, P. G. et al "Access Path Selection in a Relational Database Management System", above; Kabra, N. et al "OPT++: An object-oriented implementation for extensible database query optimization", The VLDB Journal, 8 (1): 55–78, May 1999; Pellenkoft, A. "Probabilistic and Transformation-based Query Optimization", PhD thesis, Wiskunde en Informatica, CWI, Amsterdam, The Netherlands, November 1997; and Scheufele, W. et al "Efficient Dynamic Programming Algorithms for Ordering Expensive Joins and Selections", in Advances in Database Technology-Proceedings of the 6th International Conference on Extending Database Technology, pp. 201–215, Valencia, Spain, Springer-Verlag, March 1998.) Another advantage of the approach described by Bowman and Paulley is that complete plans are generated continuously during the search. This means that it is possible to interrupt the search at any time after the first plan is found and simply keep the best plan found at the time the search is halted. Therefore, fine-grained control over the amount of enumeration effort is possible.

Early halting is a simple way of limiting the computational effort spent on join enumeration. However, a problem with simply stopping the search early is that the search effort is not very well distributed over the search space. If only a small fraction of the search space is visited, then most of the plans considered are typically very similar. An improved solution for limiting the computational effort spent on join enumeration is required that enables the search effort to be limited in a more effective way. The present invention provides a solution for these and other needs.

SUMMARY OF INVENTION

In a database system, a method for optimization of a query is described. When a query is received which requests data from a database, a plurality of plans which can be used for obtaining data requested by the query are enumerated. A search tree is created based upon these plans, with nodes of the search tree representing segments of the plans. A limited number of nodes of the search tree are selected for evaluation to limit the effort spent on query optimization. A complete plan for execution of the query is generated by evaluating the selected nodes of the search tree and, if the evaluation determines that a given node is more favorable than comparable nodes previously evaluated, retaining the given node as part of the complete plan.

DETAILED DESCRIPTION

Glossary

The following definitions are offered for purposes of illustration, not limitation, in order to assist with understanding the discussion that follows.

SQL: SQL stands for Structured Query Language, which has become the standard for relational database access, see e.g., "Information Technology—Database languages—SQL", published by the American National Standards Institute as American National Standard ANSI/ISO/IEC 9075: 1992, the disclosure of which is hereby incorporated by reference. For additional information regarding SQL in database systems, see e.g., Date, C. "An Introduction to Database Systems, Volume I and II", Addison Wesley, 1990, the disclosure of which is hereby incorporated by reference.

Introduction

The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

Computer-based Implementation

Basic System Hardware (e.g., for Desktop and Server Computers)

Figure 1:
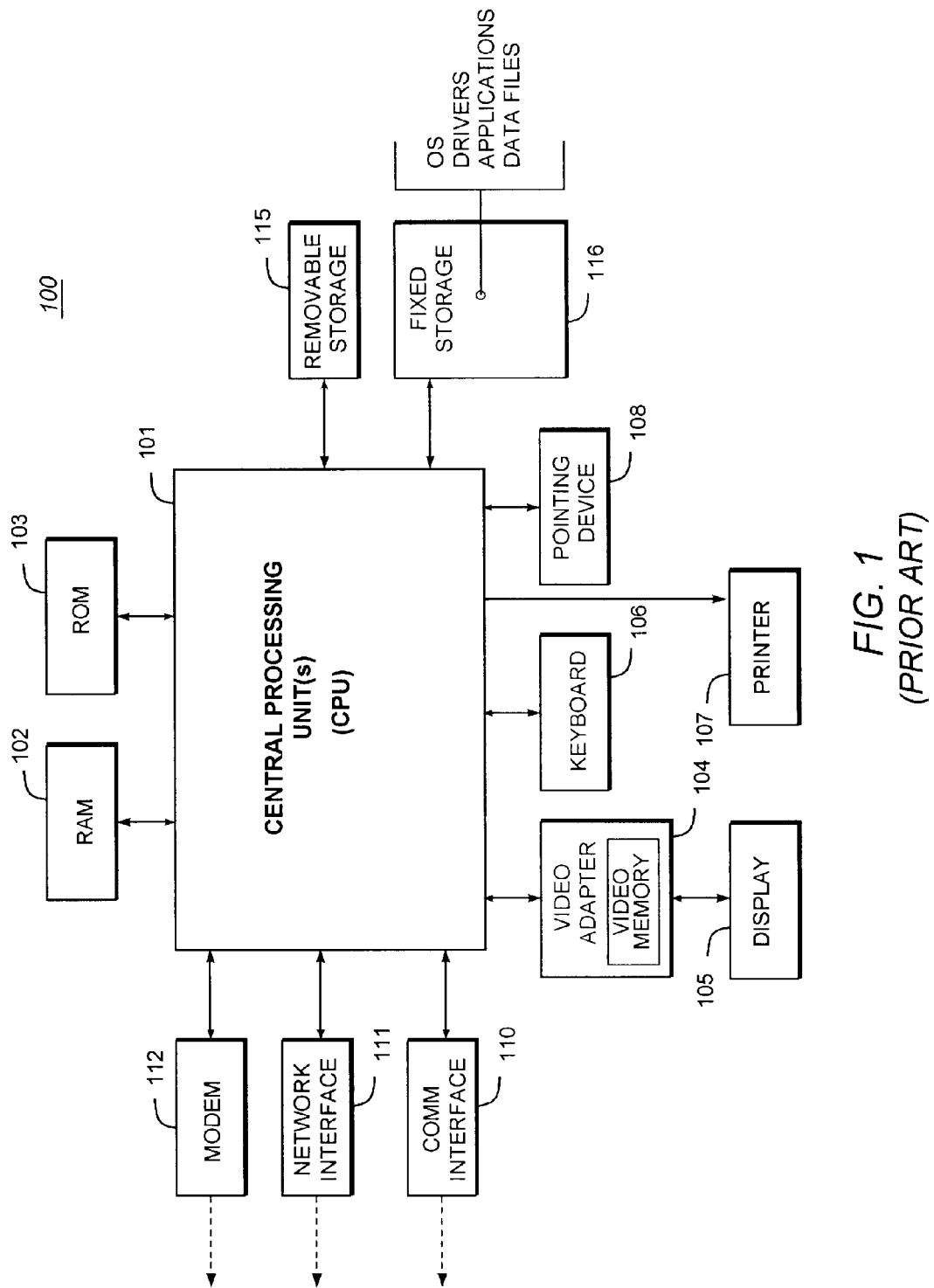
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
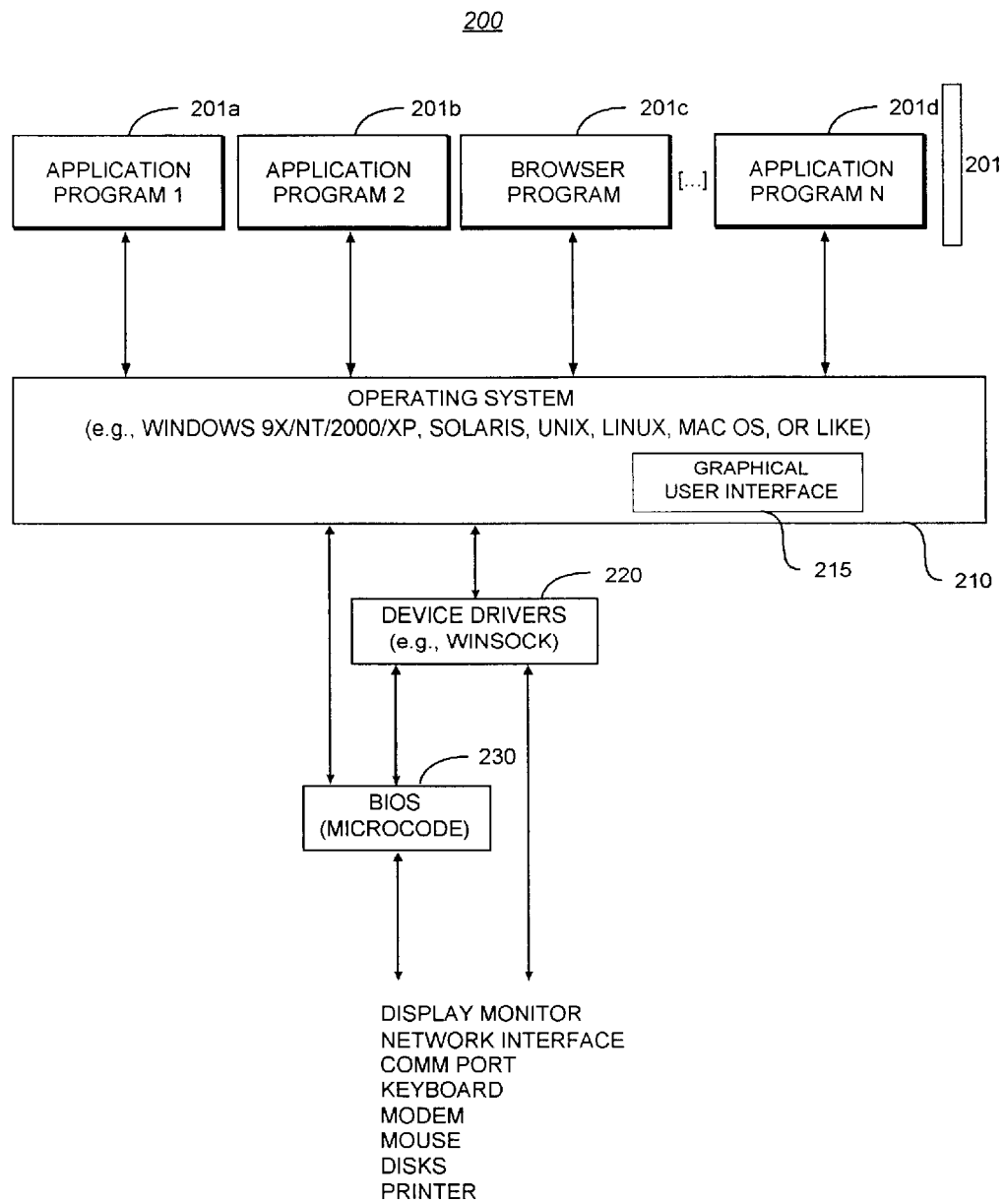
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Client/Server Database Management System

Figure 3:
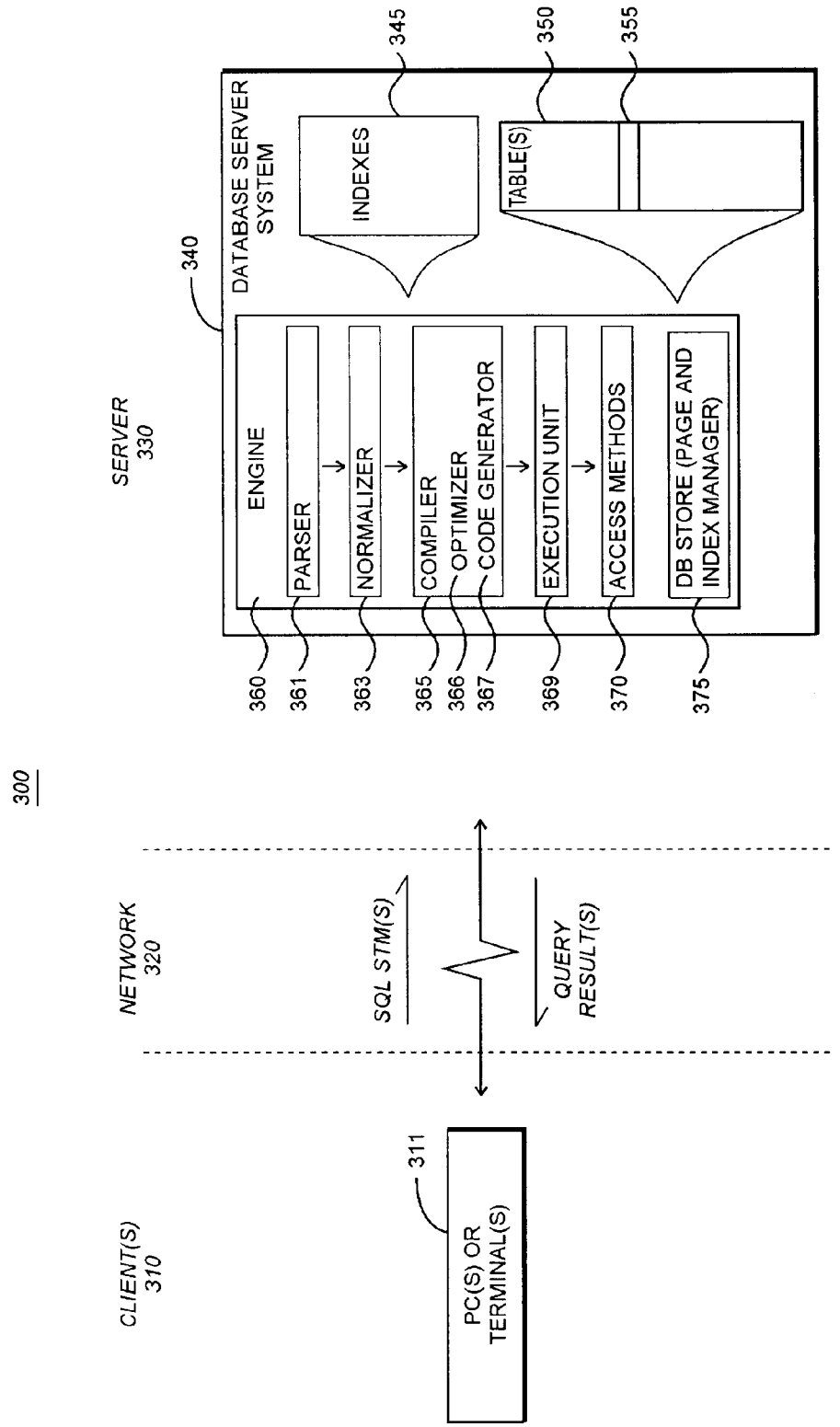
FIG. 3 illustrates the general structure of a client/server database system suitable for implementing the present invention.

While the present invention may operate within a single (standalone) computer (e.g., system 100 of FIG. 1), the present-invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft Windows client operating system (e.g., Microsoft Windows 95/98, Windows 2000, or Windows XP).

The database server system 340, which comprises Sybase (r) Adaptive Server (r) Anywhere (available from Sybase, Inc. of Dublin, Calif.) in an exemplary embodiment, generally operates as an independent process (i.e., independently of the clients), running under a server operating system such as Microsoft Windows NT, Windows 2000, or Windows XP (all from Microsoft Corporation of Redmond, Wash.), UNIX (Novell), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of Sybase-branded database servers and client/server environments generally, see e.g., Nath, A., "The Guide to SQL Server", Second Edition, Addison-Wesley Publishing Company, 1995. Additional documentation describing the operations of Sybase SQL Anywhere Studio version 8.0 (Adaptive Server Anywhere) is available from Sybase, Inc. as "SQL Anywhere Studio 8.0 Collection Documentation" (e.g., at sybooks.sybase.com/awg0800e.html).

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the client(s) 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see e.g., the above-mentioned "An Introduction to Database Systems". In addition to retrieving the data from Database Server tables, the client(s) also have the ability to insert new rows of data records into the table(s); client(s) can also modify and/or delete existing records in the table(s).

In operation, the SQL statements received from the client (s) 310 (via network 320) are processed by engine 360 of the database server system 340. The engine 360 itself comprises parser 361, normalizer 363, compiler 365, execution unit 369, access methods 370, and DB store (page and index manager) 375. Specifically, the SQL statements are passed to the parser 361 which converts the statements into a query tree—a tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer can also look-up any referential integrity constraints which exist and add those to the query.

After normalization, the query tree is passed to the compiler 365, which includes an optimizer 366 and a code generator 367. The optimizer is responsible for optimizing the query tree. The optimizer performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and determines the best execution plan, which in turn results in particular access methods being invoked during query execution. The operations of the optimizer in generating a query execution plan are described in greater detail below.

For enhancing the storage, retrieval, and processing of data records, the server 330 maintains one or more database indexes 345 on database tables 350. These database indexes 345 facilitate quick access to the data records. A database index, typically maintained as a B-Tree data structure, allows the records of a table to be organized in many different ways, depending on a particular user's needs. An index may be constructed as a single disk file storing index key values together with unique record numbers. An index key value is a data quantity composed of one or more fields from a record which are used to arrange (logically) the database file records by some desired order (index expression). The record numbers are unique pointers to the actual storage location of each record in the database file. Both are referred to internally by the system for locating and displaying records in a database file.

The following description will focus on those aspects of the database management system that are helpful for understanding the methodology of the present invention for distributing query optimization efforts over large search spaces.

Overview

Join enumeration by depth-first search has the advantage of using little memory. Also, complete, albeit non-optimal, plans are available very quickly. Therefore, a depth-first search can be halted early (i.e., before the entire search space is visited) and the best plan found at the time the search is halted can be returned. Early halting is a simple way of limiting the computational effort spent on join enumeration. However, a problem with early halting is that the search effort is not very well distributed over the search space. If only a small fraction of the space is visited, then most of the plans considered are likely to be very similar. The present invention comprises a system providing methods for limiting effort spent on a depth-first search in a more effective way.

The present invention provides fine-grained control over the effort spent on join enumeration when using depth-first search. The general approach of the present invention involves representing the search space as a tree and measuring the amount of effort spent on join enumeration as the number of nodes of the tree that are visited. A quota is chosen that represents the maximum number of nodes that may be visited and this quota is recursively distributed over the tree. The methodology of the present invention enables a wider variety of plans to be considered, thereby increasing the likelihood of finding an efficient plan.

Background

General Process of Query Optimization

Before describing the invention in more detail, it is helpful to describe the overall process of query optimization as well as the depth-first join enumeration operation as implemented in the database management system of the currently preferred embodiment. The database management system used in the currently preferred embodiment is version 8.0 of Sybase (r) Adaptive Server (r) Anywhere (ASA). Adaptive Server Anywhere is the relational database system that forms the core module of Sybase (r) SQL Anywhere (r) Studio, a suite of technologies intended for use in workgroup, mobile, and embedded applications.

Figure 4:
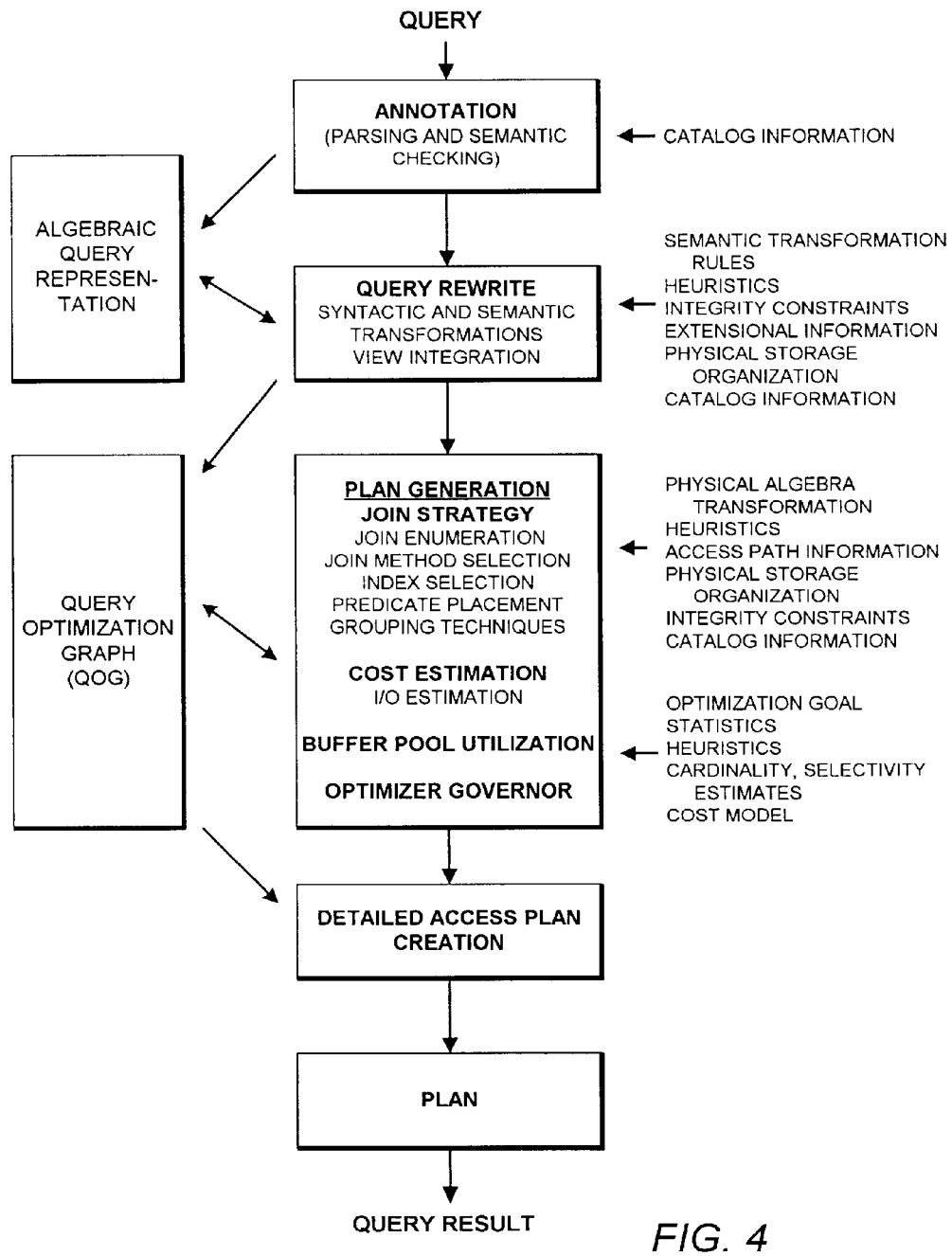
FIG. 4 illustrates the overall process of query optimization in the database system of the currently preferred embodiment.

FIG. 4 illustrates the overall process of query optimization in the database system of the currently preferred embodiment. As shown, the input to the plan generation phase of the query optimizer is a Query Optimization Graph (QOG), pronounced "cog". A QOG is the internal representation of a complete SQL statement, possibly composed of multiple "subquery blocks". The following discussion focuses exclusively on selection queries, though QOGs are also constructed for "UPDATE", "DELETE", and "INSERT" statements.

The database entities referred to by each subquery block, including tables, columns, predicates, and so on, are all included in the QOG. The set of subquery blocks within a QOG form a tree, with the outermost "SELECT" block at the root. Each subquery block, which, for example, can represent an input to a "UNION" operation, or a true subquery contained within an "EXISTS" predicate, is optimized independently in a bottom-up fashion. Complex queries, such as those involving views containing "GROUP BY" or "UNION", are modeled in a QOG through the use of multiple subquery blocks.

Plan generation involves the generation of alternative "join strategies" for each subquery block. Unlike IBM's Starburst optimizer, which separates join enumeration from plan generation and cost estimation (see, e.g., Ono, K. et al "Measuring the Complexity of Join Enumeration in Query Optimization", above), the optimizer of the currently preferred embodiment combines these processes into a single unified methodology. As shown at FIG. 4, cost estimation is an integral part of the enumeration method, because it is through comparing the costs of partial access plans that the optimizer can quickly prune significant portions of the join strategy search space. The following discussion focuses on the join enumeration process, and provides specifics regarding cost estimation only where relevant to this discussion.

Of particular interest to the present invention, an optimizer governor operates during the process of plan generation as shown at FIG. 4. One of the goals of the optimizer governor is to balance optimization time (i.e., the time spent in optimizing a query) with improved query execution performance. The optimizer governor supports the methodology of the present invention for controlling the time spent on join enumeration while also providing for consideration of a wider variety of plans. As will be described below, this methodology serves to increase the likelihood of finding an efficient query execution plan during the plan generation phase of query optimization.

The plan generation phase optimizes each subquery in the QOG independently, starting with the leaves. For each subquery, plan generation involves the following four distinct steps:

1. adjust predicate selectivities to account for disjuncts, "BETWEEN" predicates, and user estimates of selectivities;

2. construct a join graph for the query that models inner and outer equijoin predicates, sargable single-variable predicates on single quantifiers, and Cartesian products;

3. enumerate join strategies and prune the search space using a branch-and-bound heuristic; and 4. recall the least expensive (i.e., cheapest) strategy and construct the detailed access plan for that strategy.

Depth-first Join Enumeration Operation

The depth-first join enumeration operation described below is the version that is implemented in version 8.0 of Adaptive Server Anywhere. An earlier version of the depth-first join enumeration search operation is also described in commonly-owned U.S. Pat. No. 6,516,310 titled "System and Methodology for Join Enumeration in a Memory-Constrained Environment", the disclosure of which is hereby incorporated by reference in its entirety, including any appendices or attachments thereof, for all purposes.

Consider the problem of finding a left-deep plan that joins n quantifiers q1, q2, ..., qn. A quantifier may correspond to either a base table or derived table. A given permutation qi1, qi2, qi3, qi4, ..., qin represents the plan where qi1 is first joined to qi2, then qi3 is joined to the result of the previous join, then qi4 is joined to that result, and so on. This is referred to as a left-deep plan since each step joins only a single quantifier to the intermediate result. That is, no intermediate result is ever joined to the intermediate result of another join.

Figure 5:
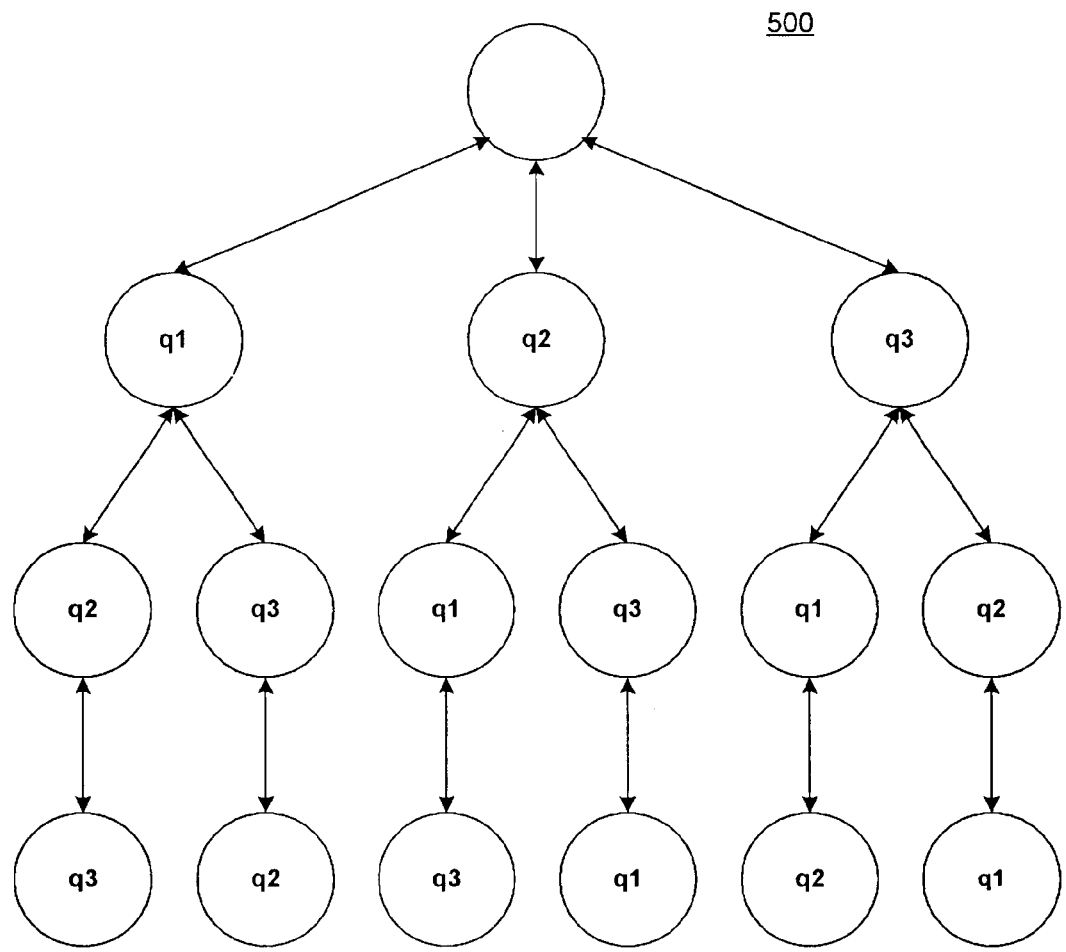
FIG. 5 illustrates an exemplary search tree representing a three quantifier search in which any permutation of the three quantifiers is a valid plan.

FIG. 5 is an example of a tree for a three quantifier search in which any permutation of the three quantifiers is a valid plan. A permutation is read starting from the root and descending to a leaf. For example, the leftmost path in the tree in FIG. 5 represents the permutation q1, q2, q3.

A complete plan includes the physical join operators used as well as the order in which quantifiers are joined. It also includes any indexes that may be used to access the base table quantifiers in the plan. Therefore, a complete plan can be represented as a sequence of triples (q, jm, ind) where q is a quantifier, jm is a join method, and ind is an index. The first quantifier in the plan has a "NULL" join method since there is no preceding intermediate result to which it may be joined. There are several possible ways to represent a plan in a search tree. One may have a quantifier node with all of the possible join methods as child nodes, and all of the possible indexes that can be used for a join method as children of the join method node. In the currently preferred embodiment, every (jm, ind) pair is treated as a child of the quantifier node, but this choice is not required for implementation of the present invention.

The following pseudocode illustrates a depth-first search join enumeration operation:

```
Pseudocode for Function 1: ENUMERATE
Input:
- A query optimization graph G
- A prefix P[1 :k] of (quantifier (q), join method (jm), index(ind)) trip
Output:
- The best plan B[1 :n] where n is the number of quantifiers to be joined
1:    i <-- k + 1
2:    while q <-- FIND-NEXT-QUANT(G)
3:
4:       while (jm, ind) <-- FIND-NEXT-JM-IND(G)
5:
6:          P[i] <-- (q, jm, ind)
7:          if PRUNE( ) = FALSE
8:             if i = n
9:                B[1 :n] <-- P[1 :n]
10:            else
11:               ENUMERATE(G, P[1 : i])
```

The argument G illustrated above is a query optimization graph (QOG) that contains the set of quantifiers to be optimized, and restrictions on how these quantifiers can be ordered in the query execution plan. An example of a restriction on the ordering of quantifiers is that the preserved tables in a left outer join must appear before the NULL-supplying tables in the permutation. The specific restrictions that are employed in the currently preferred embodiment are not relevant to the operation of the present invention. The top-level call to the above "ENUMERATE" function is "ENUMERATE (G, P)", where P is a zero-length array. Each call to this function extends the length of this array P by one.

As shown above at line 2, a valid quantifier is chosen for the current position in the permutation. At line 4 a valid (join method, index) pair is selected. Both choices take the information represented in the QOG into account so that, for example, a quantifier that is not allowed at the current position because of dependencies is never chosen. A (q, jm, ind) triple is placed at the current position in the permutation at line 6. Next, the condition at line 7 ("if PRUNE( )=FALSE") checks to determine if the current subtree should be pruned. This decision is made by estimating the cost of the current prefix and comparing this cost to that of the best plan that has been previously located. A prefix is pruned if its estimated cost exceeds that of the best plan, even if the prefix is not a complete plan itself, as joining more tables to a prefix can never reduce the cost. If a prefix is not pruned, then a check is made to determine whether this is a complete plan as shown at line 8. If so, then the plan is saved in the array B as illustrated at line 9, and the search continues. However, if the prefix is not a complete plan, then the search continues recursively with a call to "ENUMERATE(G, P[1:i])" as shown at line 11.

The above "ENUMERATE" function considers plans from a search space that is potentially exponential in the number of quantifiers, join methods and indexes. Therefore, it is not possible to enumerate all plans, particularly for complex queries. The methodology of the present invention for controlling the effort spent on plan enumeration will now be described.

Controlling the Effort Spent on Enumeration

Introduction

The above-described "ENUMERATE" function can be halted at any time after the first complete plan is found. This is a simple way to limit the computational effort spent on join enumeration. However, as previously described, one problem with early halting is this: if only a small fraction of the search space has been visited at the time enumeration is halted, then most of the plans considered are likely to be very similar. The present invention provides a solution to this problem. As previously described, the general approach involves representing the search space as a tree and limiting the number of nodes of the tree that can be visited during the search. The methodology of the present invention chooses a quota of how many nodes to visit, and then recursively distributes this quota over the search space represented by the tree. In this way, the present invention addresses the problem that most plans considered are very similar if a depth-first search is simply halted early. The methodology of the present invention for selecting a quota and distributing this quota over the search space will now be described in greater detail.

Quota Selection

As indicated above, the effort spent on join enumeration is measured as the number of nodes visited in the search tree. The number of nodes visited corresponds to the number of times lines 2 and 4 of the above-described "ENUMERATE" function are executed. The number of nodes visited is also directly proportional to the real time taken by the search, assuming that the "PRUNE" function takes constant time. To limit the effort spent on enumeration, the approach of the present invention is to place an upper bound, or quota, on how many nodes to visit during the search.

This quota or upper bound may be chosen in a number of different ways. The quota may, for instance, be selected as a fixed number of nodes to visit (e.g., 1000 nodes). Alternatively, a user or administrator may select a maximum period of time (e.g., 10 seconds) to be spent on join enumeration. This period of time may then be converted into a corresponding number of nodes to visit during the search. The quota that is initially established may be adjusted during the search process as hereinafter described (e.g., the quota may be reduced in the event a good plan is located).

Distribution of Quota Over Search Tree

In addition to using a quota, the methodology of the present invention modifies the above "ENUMERATE" function (Function 1) to distribute the quota (i.e., the search effort to be spent) over the search tree. The following "Improved ENUMERATE" pseudocode (Function 2) implements this recursive distribution:

Pseudocode for Function 2: Improved-ENUMERATE
Input:
- A query optimization graph G
- A prefix P[1 :k] of (quantifier (q), join method (jm), index (ind)) tri
- The current level L in the tree
- An array Q[1 : 2n] of quotas
Output:
- The best plan B[1 :n] where n is the number of quantifiers to be joined
1:    i <-- k + 1
2:    while q <-- FIND-NEXT-QUANT(G)
3:      if MOVE-DOWN-TREE(L,Q) = FALSE then break
4:      while (jm, ind) <-- FIND-NEXT-JM-IND(Q)
5:        if MOVE-DOWN-TREE(L,Q) = FALSE then break
6:        P[i] <-- (q, jm, ind)
7:        if PRUNE( ) = FALSE
8:          if i = n
9:            B[1 :n] <-- P[1 :n]
10:         else
11:           Improved-ENUMERATE(G, P[1 : i], L, Q)
12:         MOVE-UP-TREE(L, Q)
13:   MOVE-UP-TREE(L,Q)

The "Improved-ENUMERATE" function shown above includes two additional input parameters as well as additional procedure calls to a "MOVE-UP-TREE" function and a "MOVE-DOWN-TREE" function at lines 3, 5, 12, and 13. These "MOVE-UP-TREE" and "MOVE-DOWN-TREE" functions distribute the quota over the search tree as described below.

Two arguments to "Improved-ENUMERATE" (Function 2) that remain the same as the original "ENUMERATE" function (Function 1) are the query optimization graph G and the prefix P[1:k]. As previously described, the argument c is a query optimization graph (QOG) that includes a set of n quantifiers to be placed in the plan, and restrictions on how these quantifiers can be ordered. The argument P is an array used to store the partial plans as they are constructed. The new input parameters include the current level in the tree (L) and an array of quotas (Q[1: 2 n]). The output (B[1:n]) is an array containing the best plan found by the enumeration. Level 2 n corresponds to the root node of the search tree, level 2 n–1 corresponds to the children of the root, and so on until reaching level 1, which corresponds to the leaves of the search tree. The initial, top-level call to the "Improved ENUMERATE" function sets the current level as 2 n (i.e., the root node) and puts the entire quota in Q[2 n]. The rest of the array Q is not yet initialized at the time of the top-level call. When the function is initially called, k is equal to zero and therefore i is set to 1 at line 1. This means that the quantifier to be placed in the first position is to be determined. At line 2, the first quantifier to be considered for placement in the first position is found ("q<--FIND-NEXT-QUANT(G)"). At line 3, the "MOVE-DOWN-TREE" method of the optimizer governor is invoked to determine whether enough quota is available to continue considering this quantifier. If sufficient quota is not available, the above function stops considering the quantifier (and all of the other quantifiers not yet considered that may have been possible to place at this position) and breaks out of the "while" loop as shown at line 3.

However, if sufficient quota is available to consider the current quantifier, then at line 4, The "FIND-NEXT-JM-IND (Q) method is invoked to select a join method and index for consideration. Next, the optimizer governor is invoked as shown at line 5 ("if MOVE-DOWN-TREE(L, Q)=FALSE then break") to determine if quota is available for considering additional alternatives. If sufficient quota is not available, the process of considering additional join methods and indexes ceases. Alternatively, if quota is available, the process continues while alternatives remain to be considered.

As shown at line 6, a (quantifier, join method, index) triple is placed at the current position. Lines 7–11 operate in the same fashion as the original "ENUMERATE" function (i.e., Function 1 above). If the estimated cost of the partial plan constructed by placing the quantifier at the current position is higher than the estimated cost of the best plan previously found, then it is pruned. Otherwise, it is retained and a call is made to "Improved-ENUMERATE" as shown at line 11. This considers the quantifier to be placed at the position following the quantifier that was just placed. The recursive calls may continue until a complete plan is determined (i.e., quantifiers have been placed at all positions and a leaf has been reached) or until the available quota for considering alternatives is exhausted.

At lines 12–13, the calls to the "MOVE-UP-TREE" function adjust the level and the quota array as described below. The search process continues with consideration of alternative plans until the total amount of quota allocated for the search process is exhausted or until the end of the search space is reached (i.e., all alternatives have been considered). At this point the best plan found during the search is used to create a detailed physical access plan. The "MOVE-DOWN-TREE" and "MOVE-UP-TREE" functions of the optimizer governor will now be described.

Optimizer Governor Methods

As previously described, the initial, top-level call to the "Improved-ENUMERATE" function puts the total available quota in Q[2 n]. For example, a quota of 1000 nodes may be placed in Q[2n]. The rest of the array Q is not yet initialized at the time of the initial, top-level call. The following pseudocode for the "MOVE-DOWN-TREE" function illustrates the methodology of the present invention for distributing this quota over the search tree:

```
Pseudocode for Function 3: MOVE-DOWN-TREE
Input:
- The current level L in the tree
- An array Q[1 : 2n] of quotas
Output:
- Updated value of L
- Updated Q
- TRUE if quota is available to descend the tree, otherwise FALSE
Local Variables:
- Avail is the quota available to distribute to the next level
1:  DECREMENT(Q[L])
2:  Avail <-- DISTRIBUTE-QUOTA(Q[L], L)
3:  DECREMENT(L)
4:  Q[L] <-- Avail
5:  Q[L + 1] <-- Q[L + 1] - Avail
6:  if Avail < L
7:     MOVE-UP-TREE( )
8:     return FALSE
9:  else
10:    return TRUE
```

Each call to the above "MOVE-DOWN-TREE" function first decrements the quota at the current level as shown above at line 1, then takes some portion of the remaining quota and assigns it to the level below the current level as shown at lines 2–5. In the presently preferred embodiment, for example, the basic rule is that half of the quota available at a given level is allocated to the level immediately below. However, this is only one example of a strategy that may be employed for quota allocation. Those skilled in the art will appreciate that a number of different strategies or policies may be used to allocate available quota. For instance, one may choose to allocate a different fixed portion such as a third of the quota available, or to use a portion that is calculated based on several parameters rather than simply being a fixed fraction. After the quota is allocated, a check is made to verify that there is enough quota to reach at least one leaf in the current subtree as shown above at line 6. For example, if the available quota is 5, and the current level is 10, then it is impossible to reach a leaf. Note that the "DISTRIBUTE-QUOTA" routine is responsible for avoiding the situation where the entire search takes place without reaching any leaves. If sufficient quota is not available, then examination of the current subtree terminates. In this case, the procedure calls the "MOVE-UP-TREE" function as shown at line 7 and returns "FALSE" as shown at line 8. Otherwise, in the case where sufficient quota is available it returns "TRUE" as shown at line 10.

The following "MOVE-UP-TREE" function may be called by the "Improved-ENUMERATE" and "MOVE-DOWN-TREE" functions as described above to return unused quota at a given level of the search tree:

```
Pseudocode for Function 4: MOVE-UP-TREE
Input:
- The current level L in the tree
- An array Q[1 : 2n] of quotas
Output:
- Updated value of L
- Updated Q
1:  Q[L + 1] <-- Q[L + 1] + Q[L]
2:  INCREMENT(L)
```

As shown at line 1, any leftover quota at the current level is returned to the parent (i.e., the level immediately above the current level). There may be leftover quota at a given level, for instance, if a subtree has fewer nodes than the quota assigned, or if parts of the subtree are pruned. After any remaining quota is returned, the current level is then incremented as shown at line 2 to move up to a higher level of the search tree.

Example of Quota Distribution Over Search Tree

Figure 6:
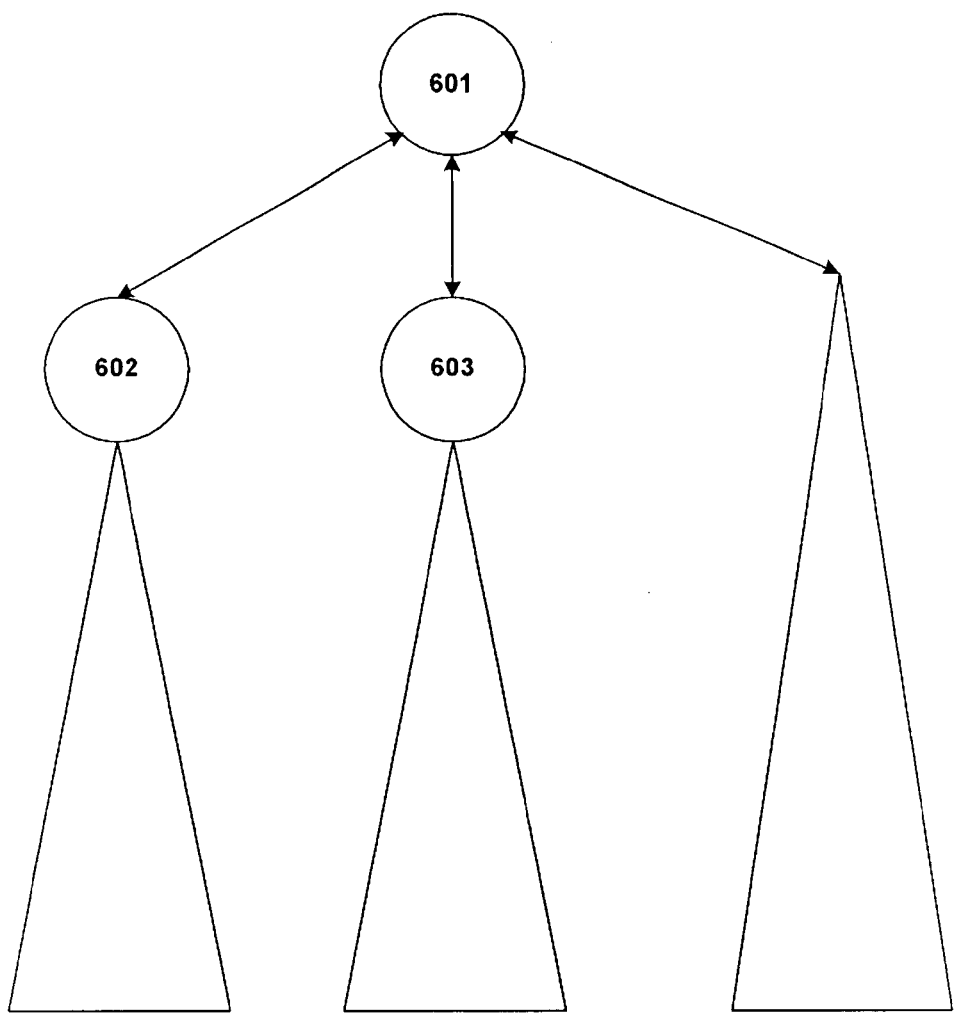
FIG. 6 shows a portion of a search tree for an exemplary search performed using the methodology of the present invention.

Consider a simple example of the operation of the methodology of the present invention. FIG. 6 shows a portion of a search tree for a sample search performed using the methodology of the present invention. As shown, the triangles represent parts of the search tree that are not detailed. Consider, for example, that the search begins at node 601 with a quota of 1000 nodes. The quota array Q is "[ . . . , 1000]" where unshown values are uninitialized. The first step in the search process is to descend to node 602. As part of this process, assume that the methodology for distributing quota described above assigns a quota of 100 to the subtree at node 602. The quota array Q is then "[ . . . , 100, 899]". Note that one node of quota was subtracted as indicated above at line 1 of the "MOVE-DOWN-TREE" function. Assume that the process of searching the subtree under node 602 then continues and visits, for example, a total of 90 nodes. At the end of this process the quota available in array Q has been decreased by 90 to "[ . . . ,10, 899]".

After returning the leftover quota available at node 602 to the root (with a call to the "MOVE-UP-TREE" function described above), the quota available in array Q is "[ . . . , 909]". Next, assume that the search proceeds to node 603 and another 100 nodes are allocated from the quota for the subtree at node 603. This changes the quota in array Q to "[..., 100, 808]". Suppose, however, that the estimated cost at node 603 indicates that it cannot contain any good candidates. Accordingly, node 603 is pruned without visiting any further nodes under node 603. In this event, the entire quota allocated to node 603 is returned to the root resulting in the following quota entries in array Q: "[..., 908]". The search continues in this manner for all remaining children of node 601 or until the quota is exhausted.

Distributing the Quota

Now, consider in more detail the manner in which quota should be distributed. A situation which should be avoided is distributing quota so that the search never reaches any leaves (i.e., never generates a complete plan). For example, if the search tree has 100 nodes, and the method for distributing quota attempts to assign a quota of 20 nodes evenly at every level, then the search will only visit internal nodes at the top of the search tree.

The approach utilized in the currently preferred embodiment of the present invention is to make the current level a lower bound on how much quota can be taken from a node when descending to a child. In this manner, the search always reaches at least one leaf in a subtree (provided enough quota is available). With a large search space, the search may only visit the first few children of a given node before exhausting the quota and moving to other parts of the tree. This raises the question of which children should get priority. One of the features of the "FIND-NEXT-QUANT" and "FIND-NEXT-JM-IND" functions referenced above is that they return items in an order that is determined by numerous heuristics. Although a number of different heuristics may be employed, the important point is that visiting only the first few children is a reasonable approach when not enough quota is available to examine an entire subtree. The first few children are the ones ranked highest in the heuristic order and therefore represent the best prediction that can be made as to which are likely to contain good plans.

A final detail about quota distribution is that one may not know how many children a given node has until the search has visited all of them. For example, the database system of the presently preferred embodiment generates (join method, index) pairs one at a time during the enumeration process in order to reduce memory usage. Accordingly, the total number of (join method, index) pairs for a given quantifier is not available until the last pair is generated. As such, it is usually not possible to use an even distribution strategy where every child is assigned an equal portion of its parent's quota.

A reasonable strategy for quota distribution is to assign a fixed portion (e.g., fifty percent) of whatever quota remains at a given level to each child as it is visited. In this case, with an initial quota of 1000 nodes the distribution of quota to the first three children is 500, 250, and 125, and each successive child receives less. This solves the problem of not knowing how many total children there are in a search tree, and is also a reasonable strategy since, as noted above, children are ranked in heuristic order. Weighting the search towards the earlier children favors those parts of the tree that the heuristics indicate are more likely to contain good plans.

Dynamic Quota Adjustment

The present invention provides a methodology for distributing search effort, which is represented by a given quota, over a search tree. A query optimizer also needs to decide how much quota should be made available for a given query. This is possible using some simple rules, although the present invention is independent of the particular rule that is chosen. In the presently preferred embodiment, a hard upper limit on the quota is imposed. This upper limit is used as the initial value for all enumerations. In addition, the quota is adjusted downward during enumeration if a relatively cheap plan is found.

As discussed above, the total quota is generally directly proportional to the real time taken by the enumeration. Therefore, during the search process this time can be estimated and compared to the estimated time of the best plan that has been found. In the currently preferred embodiment, each time a better plan is found, the overall quota is reviewed to determine if it should be adjusted downward. If the estimated enumeration cost is larger than a fixed fraction (e.g., one-fifth) of the estimated execution cost of the best plan then the total quota is adjusted and redistributed. This is done by taking the new quota, subtracting the amount that has already been used, and then redistributing the new remainder according to the usual rules (e.g., half to the current child of the root, half to its current child, and so on, down to the leaf where the new best plan was just found). Without further bookkeeping, this approach effectively resets the quota usage for the entire path from the root down to the current leaf. This may mean that some nodes use more total quota then they would under the basic distribution rule. However only those nodes that are beneath the nodes in which new best plans are found receive additional quota. Therefore, rather than being a problem, this effect can be viewed as a heuristic that adjusts the distribution dynamically to spend more time in parts of the search space where good plans are found. The internal operations of the currently preferred embodiment of the present invention will now be described in greater detail.

Detailed Internal Operation

Enumerate Implementation

The two modules described below include a number of the core routines for implementing the methodology of the present invention. The first of these is the following "qog_SubplanNode::enumerate" module, which is an implementation of the previously described "Improved ENUMERATE" pseudocode:

```
 1:  void
 2:  qog_SubplanNode::enumerate(
 3:  qog_PlanNode  *last_node,
 4:  volcano_uint  left_to_be_ordered,
 5:  volcano_int   pc,
 6:  qog_PlanNode  **pcandidates)
 7:  /****************************************************
 8:   *
 9:   * Enumerate a left-deep join strategy for all the
10:   * quantifiers and nested subplans in this subplan.
11:   *
12:   * If last_node == NULL this is the first node
  in the subplan.
13:   *
14:   ****************************************************/
15:  {
16:      qog_PlanNode    **pnextcandidates;
17:      volcano_int     pcnext;
     /* # of plan nodes candidates */
18:      volcano_int     pc_i;
19:      qog_PlanNode    *pnext;
     /* current plan node candidate */
20:          qog_IndexJoinIterator ijIterator( NULL );
21:          a_prune_level prune;
22:          qog_OptimizerGovernor *gov = GetGovernor( );
23:
24:
25:      if( left_to_be_ordered > 0 ) {
26:       pnextcandidates = (qog_PlanNode **)alloca(
     (left_to_be_ordered-1)* sizeof(qog_PlanNode *) );
27:      }
```

```
28:
29:     pc = sortCandidates(pcandidates, last_node, pc);
30:     _assertD( pc >= 1 && pc <= left_to_be_ordered );
31:
32:
33:     gov->MoveDownTree( );
34:     for( pc_i = 0; pc_i < pc; pc_i++ ) {
35:
36:        gov->AdvancePastCurrentCandidate( );
37:        if( gov->QuotaExhausted( ) ) {
38:           continue;
39:        }
40:
41:     pnext = pcandidates[pc_i];
42:     pcnext = 0;
43:     pnext->APpnPlace( last_node );
44:     if( last_node != NULL ) {
45:        last_node->APpnSetNext( pnext );
46: }
47:
48:     /* Step 1: choose a (index, join method ) for this
49:     quantifier. IJFindCandidates( ) chooses from an already
50:     established potential list of indexes and join methods
51:     and ranks the candidates. */
52:
53:     // start the <join method, index> iterator
54:     ijIterator.Restart( pnext );
55:
56:        gov->MoveDownTree( );
57:     while( ijIterator.SetNext( FALSE ) ) {
58:
59:        gov->AdvancePastCurrentCandidate( );
60:        if( gov->QuotaExhausted( ) ) {
61:           continue;
62:        }
63:
64:     /* Clear results of enumeration for this suffix.*/
65:     pnext->APpnSetNext( NULL );
66:
67:     /* This call sets
68:     (1) the index, postfilter predicates before join
69:     and compute LOP, POP for pnext(pnext can be a
quantifier or subplan).
70:     (2) the join method, postfilter predicates after
71:     the join and compute LOP and POP for pnext
(in qog_PLanNode ).
72:     */
73:
74:     pnext->APpnSet ( ijIterator.GetIndex( ),
ijIterator.GetJoin( ) );
75:
76:     // Check if the governor decided to prune this prefix.
77:        prune = gov->GetPruneLast( );
78:
79:     if( prune != PRUNE_NONE ) {
80:        continue;
81:     }
82:
83:     if( left_to_be_ordered == 1 ) {
84:     // This is a complete plan and it is cheaper
than the best saved so far.
85:        this->apCompleteSaveBest( );
86:     } else {
87:        // go on with finding the suffix for this plan
88:        if( pcnext == 0 ) {
89:           pcnext = pnFindCandidates(pnext,
pnextcandidates, left_to_be_ordered-1 );
90:           pcnext = sortCandidates(pnextcandidates,
pnext, pcnext );
91:        }
92:
93:     enumerate( pnext, left_to_be_ordered - 1,
pcnext, pnextcandidates );
94:     }
95:
96:     } // end for all (index, join method) candidates:
while( ijIterator.SetNext( ) )
97:
98:     // advance past remaining <jm,index> candidates
99:        gov->SkipRemainingCandidates( );
100:
101:    /* finish considering pnext */
102:    pnext->APpnUnplace( );
103:
104:    } // end for all quantifier candidates:
for( pc_i = 0; pc_i < pc; pc_i++ )
105:
106:    // advance past remaining join candidates
107:    gov->SkipRemainingCandidates( );
108: }
109:
```

The above "qog_SubplanNode::enumerate" function attempts to place quantifiers in the most efficient order. The estimated execution cost of each plan prefix that is evaluated is compared to other alternatives. Plans are retained if they are found to be more efficient than those previously considered. Less efficient plans are pruned.

The call to "sortcandidates" shown at line 29 locates a candidate quantifier to be considered for placement in a position of the current subplan. Next, at line 33, a "MoveDownTree" method is invoked to determine whether sufficient quota is available to consider this quantifier. If sufficient quota is not available (e.g., if quota is exhausted), consideration of this quantifier ceases and the method skips the rest of the loop at line 38. However, if sufficient quota is available to consider the current quantifier, then an "ijiterator" is started at line 54 to consider possible join methods and indexes that can be applied to the quantifier at this position. Next, as shown at lines 56–62 alternative join methods and indexes are-considered while quota is available.

As shown at lines 65–74 a quantifier, join method, and index triple is placed at the current position. If the estimated cost of placing this triple at the current position is less than that of the best plan previously found, the current selection is retained. Otherwise it is pruned. If the current selection is retained then a recursive call is made to "enumerate" as shown at line 93 to consider the next quantifier to be placed. This process may continue until quantifiers have been placed at all positions and a leaf has been reached (i.e., "left_to_be_ordered" equals 1 as checked at line 83) or the available quota is exhausted.

The calls to "SkipRemainingCandidates( )" at lines 99 and 107 cause the search process to move up the search tree to consider another branch (i.e., another subtree). As previously described, the search process may continue until the quota is exhausted or the end of the search space is reached. When the quota is exhausted or all alternatives have been considered, the most efficient plan identified during the search is used for execution of the query.

Optimizer Governor Implementation

The following optimizer governor module ("qog_OptimizerGovernor") includes several methods or functions for assigning and distributing quota to regulate the effort spent on plan enumeration:

```
1: #include "qog_optgov.hpp"
2:
3: qog_OptimizerGovernor::qog_OptimizerGovernor( ):
4:    _quota( NULL ),
5:    _number_fully_costed_plans( 0 ),
6:    _disabled( TRUE )
```

-continued

```
7:  /*******************************************/
8:  {
9:      _quota_upper_limit = 100000;
10:     _best_cost_divisor = 500;
11: }
12:
13:
14: qog_OptimizerGovernor::~qog_OptimizerGovernor(void)
15: /*******************************************/
16: {
17: }
18:
19:
20: void
21: qog_OptimizerGovernor::Disable( void )
22: /*******************************************/
23: {
24:     _assertD( ! _disabled );
25:     _assertD( _level == _max_level );
26:     _quota = NULL;
27:     _disabled = TRUE;
28: }
29:
30:
31: void
32: qog_OptimizerGovernor::MoveDownTree( void )
33: /*******************************************/
34: {
35:     _assertD( ! _disabled );
36:     _assertD( _level <= _max_level );
37:     _level --;
38:     _assertD( _level <= _max_level );
39:     _quota[ _level] = 0;
40: }
41:
42: void
43: qog_OptimizerGovernor::calculateQuota( void )
44: /*******************************************/
45: {
46:     int available_quota;
47:
48:     _assertD( ! _disabled );
49:     _assertD( _level < _max_level );
50:
51:     // determine how much quota is available
52:     if( _level == (_max_level - 1) ) {
53:         available_quota = _max_nodes_to_cost - _number_nodes_costed;
54:     } else {
55:         _assertD( ( _level + 1) < _max_level );
56:         available_quota = _quota[ _level + 1 ];
57:     }
58:
59:     // assign a fixed fraction of the available
60:     // quota to the next candidate
61:     _quota[ _level ] = available_quota / 2;
62:
63:     // check for the case where the quota is less
64:     // than needed to cost one complete plan
65:     if( _quota[ _level ] <= ((_level / 2)+1) ) {
66:         if( available_quota < (( _level / 2)+1) ) {
67:             _quota[ _level ] = 0;
68:         } else {
69:             _quota[ _level ] = available_quota;
70:         }
71:     }
72:
73:     // subtract the quota assigned to this node from the parent
74:     if( _level < (_max_level - 1) ) {
75:         _assertD( (_level + 1) < _max_level );
76:         _quota[ _level + 1 ] -= _quota[ _level ];
77:     }
78: }
79:
80: void
81: qog_OptimizerGovernor::bestCostFound( void )
82: /*******************************************/
83: {
84:     _assertD( ! _disabled );
85:     _assertD( _level < _max_level );
86:
87:     int level = _level;
88:     for( int i=_max_level-1; i >= level; --i ) {
89:         _level = i;
90:         calculateQuota( );
91:     }
92: }
93:
94: void
95: qog_OptimizerGovernor::moveUpTree( void )
96: /*******************************************/
97: {
98:     _assertD( ! _disabled );
99:     _assertD( _level < _max_level );
100:
101:    if( _level < (_max_level -1) ) {
102:        _assertD( (_level + 1) < _max_level );
103:        _quota[ _level + 1 ] += _quota[ _level ];
104:    }
105:    _level ++;
106:    _assertD( _level <= _max_level );
107: }
108:
109:
110: void
111: qog_OptimizerGovernor::AdvancePastCurrentCandidate( )
112: /*******************************************/
113: {
114:    _assertD( !_disabled );
115:
116:    moveUpTree( );
117:    -- _level;
118:    calculateQuota( );
119: }
120:
121: void
122: qog_OptimizerGovernor::SkipRemainingCandidates( )
123: /*******************************************/
124: {
125:    _assertD( ! _disabled );
126:    moveUpTree( );
127: }
128:
129:
130: void
131: qog_OptimizerGovernor::Reset(qog_SubplanNode *spn,
132:              uint16    degree,
133:              int32 *   quota_array )
134: /*******************************************/
135: {
136:    _assertD( _disabled );
137:
138:    _max_nodes_to_cost = _quota_upper_limit;
139:    if( _max_nodes_to_cost < degree ) {
140: _max_nodes_to_cost = degree;
141:    }
142:
143:    _subplan = spn;
144:    _number_nodes_costed = 0;
145:    _number_fully_costed_plans = 0;
146:    _number_pruned = 0;
147:    _num_improvements = 0;
148:    _best_cost_position = 0;
149:
150:    _degree = degree;
151:    _max_level = 2 * _degree;
152:    _level = _max_level;
153:
154:    _best_cost = MAX_ESTIMATE;
155:
156:    _prune_last = PRUNE_NONE;
157:    _disabled = FALSE;
158:
159:    _assertD( quota_array != NULL );
160:    _quota = quota_array;
161: }
162:
```

-continued

```
163:    a_bool
164:    qog_OptimizerGovernor::isBestPlanSet( void )
165:    /************************************/
166:    {
167:       return ( _best_cost_position != 0 );
168:    }
169:
170:
171:    void
172:    qog_OptimizerGovernor::LogPlan( qog_PlanNode
*current_last_node )
173:    /************************************/
174:    {
175:       qog_Estimate *current_cost =
current_last_node->APpnGetCost( );
176:       an_estimate_cost current_total_cost =
current_cost->GetTotalCost( );
177:       a_bool      is_cheaper;
178:
179:       // The best plan is re-costed while being restored
180:       // after enumeration. We don't want the governor
to do anything when
181:       // LogPlan( ) is called during this re-costing.
182:       if( _disabled ) {
183:          return;
184:       }
185:
186:       // check that the governor is getting correct info
187:       _assertD( current_total_cost >= 0 );
188:
189:       // keep track of the number of nodes costed
190:       ++ _number_nodes_costed;
191:       _assertD( _level < _max_level );
192:       -- _quota[ _level ];
193:
194:
195:       if( _level == 0 ) {
196:          // keep track of the number of fully costed plans
197:          _number_fully_costed_plans ++;
198:       }
199:
200:       if( isBestPlanSet( ) ) {
201:          is_cheaper = ( current_total_cost < _best_cost );
202:       } else is_cheaper = TRUE;
203:
204:
205:       // update best cost information
206:       if( is_cheaper ) {
207:          _prune_last = PRUNE_NONE;
208:          if( _level == 0 ) {
209:             // Current (complete) plan is best so far; save it
210:             _best_cost = current_total_cost;
211:             _best_cost_position = _number_nodes_costed;
212:          }
213:       } else {
214:          _prune_last = PRUNE_NODE;
215:       }
216:
217:       // adjust the quotas if we have just found a new
best cost
218:       if( _best_cost_position == _number_nodes_costed ) {
219:
220:          if( _best_cost_divisor > 0 &&
221:             (_best_cost / _best_cost_divisor) < _max_nodes_to_cost) {
222:
223:             _max_nodes_to_cost = _best_cost / _best_cost_divisor;
224:          }
225:
226:          if( _max_nodes_to_cost < (3 * (_degree + 1)) ) {
227:             _max_nodes_to_cost = 3 * ( _degree + 1);
228:          }
229:
230:          if( _max_nodes_to_cost > _quota_upper_limit ) {
231:             _max_nodes_to_cost = _quota_upper_limit;
232:          }
233:
234:       bestCostFound( );
235:
236:          ++ _num_improvements;
237:       }
238:    }
```

The "qog_OptimizerGovernor( )" constructor shown above at lines 3–11 sets a quota ("quota_upper_limit" at line 9) of 100,000 nodes. The "MoveDownTree" and "calculateQuota" methods illustrated at lines 31–78 together with the "AdvancePastCurrentCandidate" method shown at lines 110–199 distribute the available quota over the search tree as previously described. In the currently preferred embodiment, the "calculateQuota" method determines how much quota is available at a level and assigns a fixed fraction of the quota that is available at each level of the tree (e.g., one half the available quota as shown at line 61). A check is then made as shown at lines 65–71 to determine if there is sufficient quota available to reach the leaf level if quota is assigned at the specified rate. If sufficient quota is determined to be available, the quota is assigned at the current level and is subtracted from the available quota as illustrated at lines 73–78.

The "moveUpTree" method at lines 94–107 takes any remaining quota in a subtree and reassigns it when examination of a subtree ceases (e.g., in the event a subtree is found to be inefficient and is pruned). The "AdvancePastCurrentCandidate" method at lines 110–119 moves up the tree from a given node by invoking "moveUpTree" and then recalculates the quota for moving down to the next node. At lines 121–127, "SkipRemainingCandidates" moves up the tree (i.e., invokes "moveUpTree") when examination of a given subtree terminates.

The "bestCostFound" method at lines 80–92 and the "LogPlan" method at lines 171–237 provide for adjusting the available quota when a new best plan is found. As previously described, if a new best plan is found, it is often desirable to reduce the available quota so that a disproportionate amount of time is not spent in plan enumeration when a good plan has already been identified. These methods evaluate the quota when a new best plan is found. Based on the result of this evaluation, the quota may be adjusted. If an adjustment is made, the adjusted quota is then redistributed over the search space. The "LogPlan" method also includes code for handling plans that have been identified. Of particular interest, the "LogPlan" method includes a routine at lines 206–215 for pruning nodes that are determined to be less efficient than those previously identified.

Experimental Comparison

The performance of a system constructed in accordance with the teachings of the present invention was tested using a suite of queries used to detect performance regressions in a Sybase (r) Adaptive Server (r) Anywhere database system. From the test suite, the 84 queries having a join degree of ten or higher were selected. The highest join degree was 30. The following three strategies were compared.

The first strategy stops the search process after the first complete plan is found by the enumeration. This approach effectively performs a greedy search based on the heuristic ranking of the join candidates and join method, index) pairs. The second strategy uses the unmodified depth-first search technique (i.e., the original ENUMERATE" function illustrated above as Function 1), but uses a quota to limit the number of nodes that can be visited. The join enumeration process is simply halted when this quota is exhausted. The quota is initially set to be 100,000 nodes, and this number is adjusted downward if a cheap plan is found. Specifically, the quota is changed to be the estimated cost of the plan divided by a constant if that value is less than the current quota.

The third strategy sets and adjusts an upper limit on the number of nodes costed in the same manner as strategy two, and uses the same initial quota of 100,000 nodes. However, the third strategy recursively distributes this quota over the search space using the system and methodology of the present invention.

All three of these strategies were used to optimize the 84 test queries. The number of nodes visited and the estimated costs of the best plans found were summed over all 84 queries. The results of testing were as follows:

All three of these strategies were used to optimize the 84 test queries. The number of nodes visited and the estimated costs of the best plans found were summed over all 84 queries. The results of testing were as follows:

|  | [t1] | | |
|---|---|---|---|
|  | Strategy 1 | Strategy 2 | Strategy 3 |
| nodes visited | 2590 | 297,282 | 143,128 |
| estimated cost (secs) | 101,005 | 2315 | 95 |

As expected, strategy one visited the fewest nodes (2590) since it simply stopped searching after finding the first complete plan. However, the plans that it found were more than 40 times more costly than those found by strategy two and more than 1,000 times more costly than those found by strategy three. Strategy two visited roughly twice as many nodes (297,282) as strategy three (143,128). However, despite visiting a larger number of nodes, strategy two found plans that were roughly 25 times as costly (estimated costs of 2315 seconds) as those located by strategy three (estimated costs of 95 seconds). Note that the different number of nodes visited by strategies two and three is consistent with the fact that they both adjusted quota in the same manner. As strategy three located better plans, it was able to reduce the available quota and, therefore, spend less time optimizing the queries.

Advantages of Methodology

The present invention allows any chosen amount of effort (i.e., quota) to be distributed over the search space of a depth-first join enumeration. This results in the consideration of plans from many parts of the search space. It contrasts with simply stopping the search (i.e., early halting), which only searches a left-most slice of the tree containing plans that are usually quite similar. The invention has two advantages over the approach of searching multiple spaces and considering whether or not the search should be stopped after each space is completed. The first advantage is that any value can be chosen for the quota. As described above by Lohmen (in "System for Adapting Query Optimization Effort to Expected Execution Time", above), multiple search spaces can be defined, but there is only an indirect relationship between the parameters that define a search space and its size. Furthermore, join degree is one of the parameters that determines the size, and this parameter cannot be chosen. For queries involving a large join degree, even the most restrictive choice of the remaining parameters may result in an excessively large space to search. Quota, on the other hand, can be chosen independently of the size of the search space. In fact, an alternative way of viewing distribution of quota is as a way of dynamically restricting a search space to a chosen size.

The second advantage of the present invention over a multiple search space approach is that no plan is ever visited twice. If multiple search spaces are used, then any overlap means that some plans are considered more than once. An advantage inherited from depth-first search is that the overall memory usage is relatively low, especially compared to dynamic programming approaches. The additional memory required to distribute quota is linear in the join degree.

The methodology of the present invention results in a search that visits a subset of the tree that is bushier at the top than at the bottom. In other words, more effort is spent trying different prefixes than different suffixes. This occurs because quotas are larger near the root node of the tree, and the recursive breakup while descending the tree quickly reduces the quota to the point where the main distribution rule is modified to ensure that a leaf node is reached. Fortunately, this approach is a good way to distribute the quota (i.e., search effort). For large join degrees, the cost estimates used to choose between alternative plans become increasingly meaningless as more and more quantifiers are joined. This is because errors in selectivity estimation are compounded. For this reason it is appropriate to rely more heavily on costing for the prefixes, but fall back to reliance on heuristic choices for the suffixes. When there is too little quota to distribute in the usual way, the methodology of the present invention allocates enough quota to reach a leaf by choosing the first quantifier, or join method, index) pair at each step. The fact that choices are generated in order according to heuristics means that the search therefore simply relies on the heuristics when sufficient quota is not available to evaluate every alternative.

In the currently preferred embodiment of the present invention, the one basic input parameter is the overall quota. This parameter has the desirable characteristic of being directly proportional to the real time used for plan enumeration. Additional parameters are used to define how the quota is distributed. In the currently preferred embodiment, a single quota distribution parameter is used. This parameter is the fraction of quota available at a given level that is assigned to the level immediately beneath (i.e., assigned from a parent to its child). Recall from the above discussion that this fraction is set to be one-half in the currently preferred embodiment. However, this fraction could be readily changed, or the distribution could be replaced by one using more parameters. However, in testing, the approach of allocating half of the available quota to each child has been found to work well on a wide variety of queries.

Additional parameters can also be used to dynamically adjust the quota, if desired. For example, the enumeration time may be limited to a fixed fraction of the estimated execution time. Those skilled in the art will appreciate that a number of other variations are possible. Although other approaches may also be used, the simple, linear rule of limiting the enumeration time to a fixed fraction of the estimated execution time has been found to work well in practice.

One possible limitation of the methodology is that it cannot predict exactly how much pruning will take place during a search. If large portions of the search space are pruned, it is possible to reach the end of the search space and still have quota remaining. However, two characteristics of the invention tend to mitigate this issue. The first is that unused quota is always returned to a parent node to be used somewhere else during the search process. The second is that the quota distribution is weighted toward the earlier nodes in every sequence. Together, these characteristics typically translate pruning into a flattening of the distribution that simply moves unused quota from earlier nodes toward later ones.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

I claim:

1. In a database system, a method for optimization of a query, the method comprising:
   receiving a query requesting data from a database;
   enumerating a plurality of plans which can be used for obtaining data requested by the query;
   creating a search tree based on said plurality of plans, the search tree having nodes representing segments of said plurality of plans;
   selecting a limited number of nodes of the search tree for evaluation to limit effort spent on query optimization; and
   generating a complete plan for execution of the query by performing the substeps of:
   evaluating the selected nodes of the search tree; and
   if the evaluation determines that a given node is more favorable than comparable nodes previously evaluated, retaining the given node as part of the complete plan.

2. The method of claim 1, wherein said query requests data from a plurality of database tables.

3. The method of claim 2, wherein said enumerating step includes enumerating a plurality of join strategies.

4. The method of claim 1, wherein said enumerating step includes using a depth first search.

5. The method of claim 1, wherein nodes of said search tree include join methods.

6. The method of claim 1, wherein nodes of said search tree include available indexes.

7. The method of claim 1, wherein nodes of said search tree include tables to be joined.

8. The method of claim 1, wherein said selecting step includes selecting nodes in different portions of the search tree.

9. The method of claim 8, wherein said selecting step includes adjusting the number of nodes of the search tree for evaluation when a complete plan for execution of the query is determined.

10. The method of claim 1, wherein said evaluating step includes comparing estimated execution costs of the selected nodes.

11. The method of claim 1, wherein said evaluating step includes evaluating nodes until a complete plan is determined.

12. The method of claim 1, wherein said evaluating step includes evaluating nodes until the limited number of nodes have been evaluated.

13. The method of claim 1, further comprising:
   comparing a complete plan generated for execution of the query with a complete plan previously determined and retaining the complete plan having more favorable estimated execution costs.

14. A computer-readable medium having computer-executable instructions for performing the method of claim 1.

15. A downloadable set of computer-executable instructions for performing the method of claim 1.

16. In a database system, a method for optimizing execution of a query, the method comprising:
   receiving a query requesting data from a database;
   determining available sub-plans for obtaining data requested by the query, each sub-plan comprising a portion of an overall plan for obtaining the requested data;
   selecting a quota, said quota comprising a limitation on the sub-plans to be considered for purposes of generating the overall plan;
   while quota is available, generating the overall plan by performing the substeps of:
   estimating execution costs of available sub-plans;
   retaining sub-plans having lower estimated execution costs than other sub-plans; and
   forming an overall plan based on the retained sub-plans.

17. The method of claim 16, wherein the query requests data from a plurality of database tables.

18. The method of claim 17, wherein the sub-plans include join methods for joining data from said plurality of database tables.

19. The method of claim 17, wherein the sub-plans include indexes available for providing access to data.

20. The method of claim 16, wherein said determining step includes using a depth-first search.

21. The method of claim 16, wherein said quota comprises an upper limit on the sub-plans to be considered.

22. The method of claim 16, wherein said quota is adjusted if an overall plan is determined.

23. The method of claim 22, wherein said quota is reduced if the overall plan has favorable execution costs.

24. The method of claim 22, wherein said quota is adjusted to equal a fixed fraction of the estimated execution costs of the overall plan.

25. The method of claim 16, further comprising:
   distributing the quota over a search space comprising available sub-plans to consider sub-plans in various areas of the search space.

26. The method of claim 25, wherein said quota is recursively distributed over the search space.

27. The method of claim 16, further comprising:
   when quota is exhausted, selecting the most favorable overall plan that has been generated.

28. The method of claim 16, further comprising:
   using the most favorable overall plan that is generated to provide data in response to the query.

29. The method of claim 16, further comprising:
   using the overall plan for creating a physical access plan for obtaining the data requested by the query from the database.

30. In a database system, a method for join enumeration, the method comprising:
   receiving a request for data from a plurality of database tables;
   enumerating alternative join strategies for obtaining the requested data;
   creating a tree representation of said alternative join strategies;
   selecting a quota comprising a number of said alternative join strategies to be considered for obtaining the requested data;
   distributing the quota over the tree representation to select alternative join strategies in various areas of the tree representation; and
   generating a plan for obtaining the requested data based on comparing the selected alternative join strategies and using alternative join strategies having more favorable execution costs.

31. The method of claim 30, wherein said alternative join strategies comprise a selected one of join method, available indexes, and tables to be joined.

32. The method of claim 30, wherein said distributing step includes allocating sufficient quota to reach a leaf of said tree representation.

33. The method of claim 30, wherein said distributing step includes distributing the quota recursively over the tree representation.

34. The method of claim 30, wherein said quota is reduced if a plan having favorable execution costs is generated.

35. The method of claim 34, wherein said quota is reduced to a fixed fraction of the estimated execution costs of a plan.

36. The method of claim 30, further comprising:
comparing a plan generated for execution of the query with a plan previously determined and retaining the plan having more favorable estimated execution costs.

37. The method of claim 36, further comprising:
when the quota is exhausted, using the plan that has been retained for obtaining the data requested by the query.

38. The method of claim 30, further comprising:
using the plan for creating a physical access plan for returning the data requested by the query.

* * * * *